United States Patent [19]

Rinde

[11] 4,012,265
[45] Mar. 15, 1977

[54] LOW-DENSITY MICROCELLULAR FOAM AND METHOD OF MAKING SAME

[75] Inventor: James A. Rinde, Livermore, Calif.
[73] Assignee: The United States of America as represented by the United States Energy Research and Development Administration, Washington, D.C.
[22] Filed: Sept. 2, 1975
[21] Appl. No.: 609,641
[52] U.S. Cl. .............................. 106/122; 106/196
[51] Int. Cl.² ............................................ C08L 1/12
[58] Field of Search .......................... 106/122, 196; 260/23 UR, 227; 264/41, 49, 217; 428/340; 536/76

[56] References Cited

UNITED STATES PATENTS

| | | | |
|---|---|---|---|
| 3,261,704 | 7/1966 | Stieg | 106/122 |
| 3,428,584 | 2/1969 | Riley | 264/41 |
| 3,819,390 | 6/1974 | Teng | 106/122 |
| 3,849,350 | 11/1974 | Matsko | 260/32.8 SB |

Primary Examiner—Theodore Morris
Attorney, Agent, or Firm—Dean E. Carlson; Roger S. Gaither; L. E. Carnahan

[57] ABSTRACT

Low-density microcellular foam having a cell size of not greater than 2 $\mu$m and method of making by dissolving cellulose acetate in an acetone-based solvent, gelling the solution in a water bath maintained at 0°–10° C for a selected period of time to allow impurities to diffuse out, freezing the gel, and then freeze-drying wherein water and solvents sublime and the gel structure solidifies into low-density microcellular foam. The foam has a density of 0.065 to $0.6 \times 10^3$ kg/m³ and cell size of about 0.3 to 2 $\mu$m. The small cell size foam is particularly applicable for encapsulation of laser targets.

2 Claims, No Drawings

LOW-DENSITY MICROCELLULAR FOAM AND METHOD OF MAKING SAME

The invention described herein was made in the course of, or under, Contract No. W-7405-ENG-48 with the United States Energy Research and Development Administration.

BACKGROUND OF THE INVENTION

This invention relates to a low density microcellular foam, and more particularly, to a low density foam having a cell size of not greater than 2 $\mu$m and to a method for making such small cell size, low density foam.

Conventionally known foams, such as polystyrene, polyurethane, polyethylene, etc., can be obtained in low densities between 0.01 and $0.1 \times 10^3$ kg/m$^3$. However, the cell size is generally too large, 200 $\mu$m and above. Other foams produced by the same expansion techniques have similar cell sizes. To achieve small uniform cells, the number of nucleation sites must be increased so that more smaller cells develop. One foam of this type is Pneumacel, made by E. I. duPont de moures Co. which has a density of $0.02 \times 10^3$ kg/m$^3$ and cells that are about 25 $\mu$m in diameter. Foams have been reported in the published literature that have cells a few micrometers in diameter, but have high densities. Various metods have been utilized to produce low density foam, as exemplified by U. S. Pat. No. 3,849,350 issued Nov. 19, 1974. However, a need exists in the art for a small cell size, low density foam and method of fabricating such.

SUMMARY OF THE INVENTION

The present invention provides a low-density, microcellular foam and method of making same. The foam has a cell size ranging from less than 0.3 $\mu$m to not greater than 2 $\mu$m and a density ranging from about 0.065 to $0.6 \times 10^3$ kg/m$^3$. Broadly, the foam is produced from cellulose acetate solutions by a two-step process of (1) phase-inversion, which produces a polymer gel with micrometer size pores or cells, followed by (2) freeze-drying of the polymer gel. For phase-inversion to take place the polymer solution must contain the polymer, a good solvent, a swelling agent, and a non-solvent. More specifically, cellulose acetate is the polymer, acetone and ethyl D-L lactate are the solvents, magnesium perchlorate is the swelling agent, and water is the non-solvent. The cellulose acetate solution is gelled in a water bath maintained at 0°–10° C wherein the resulting gel is allowed to soak at temperatures of 0°–30° C for periods up to 24 hours to provide time for solvents and swelling agents to diffuse out of the gel. After soaking, the gel is frozen in −70° to −80° C liquid pentane and transferred to a freeze drying chamber. During freeze-drying, water and solvents sublime and the gel structure solidifies into foam having both low density and very small cell size (not greater than 2 $\mu$m).

The foam may be made in sheet, mold, or extruded forms. For encapsulation applications, the article to be encapsulated (such as a quantity of fusion fuel as a laser target) is surrounded by the cellulose acetate solution during the soaking, freezing, and freeze-drying operations such that the foam is in essence made in place about the encapsulated article.

Therefore, it is an object of this invention to provide a low density microcellular foam.

A further object of the invention is to provide a foam having a density of 0.065 to $0.6 \times 10^3$ kg/m$^3$ and a cell size not greater than 2 $\mu$m.

Another object of the inention is to provide a method for making a low density microcellular foam.

Another object of the invention is to provide a method for making a low density foam having a cell size not greater than 2 $\mu$m from a polymer solution consisting of a polymer, a solvent, a swelling agent and a non-solvent.

Another object of the invention is to provide a method for making a low density, very small cell size foam from a cellulose acetate solution via operational steps which include phase-inversion which produces a polymer gel with micrometer size cells, and freeze-drying of the polymer gel wherein the gel structure solidifies into foam.

Other objects of the invention will become readily apparent from the following description.

DESCRIPTION OF THE INVENTION

The present invention is directed to a low density, microcellular foam and method of making such foam having a density of 0.065 to $0.6 \times 10^3$ kg/m$^3$ and a cell size of less than about 0.3 $\mu$m to 2 $\mu$m. The foam is produced from a polymer solution composed of a cellulose acetate as the polymer, magnesium perchlorate as a swelling agent, water as a non-solvent, and acetone and ethyl lactate as solvents.

As pointed out above, inasmuch as the known low density fine cell size (microcellular) foam had a cell size of about 25 $\mu$m, applications such as encapsulation of laser targets requiring a foam layer of 10 to 60 $\mu$m thickness, for example, could not be accomplished with existing foams due to the relatively large cell size. To achieve both low density and micrometer size cells in the same foam to meet requirements, such as those for laser targets, a phase-inversion technique was used to produce the cellular structure of this invention.

Phase-inversion processes to make low-density microcellular foams have been used in making asymmetric, reverse-osmosis membranes for water desalination, as exemplified in articles by R. E. Kesting, J. Appl. Polm. Sci. 9, 663(1965); R. E. Kesting et al., J. Appl. Polym. Sci. 9, 1873 (1965); and B. Kunst et al., J. Appl. Polym. Sci. 14, 1983 (1970). However, the method and solution formulations of this invention differ substantially from those used for making the membranes.

Basically, the procedure utilized for making the cellulose acetate foam having both low density and small cell size is to dissolve the polymer in a solvent system consisting of a good solvent, a swelling agent, and a non-solvent. This solution may be cast on a flat plate to form a thin sheet or into a mold to form a desired configuration and then dipped into a water bath, maintained at 0°–10° C, to gel the polymer; or it may be extruded through an orifice, having a desired cross-sectional configuration, directly into the water bath. The polymer gels in the ice water, which is a non-solvent for cellulose acetate, and the solvent and swelling agent diffuse out of the polymer gel. After soaking in water, the polymer is frozen in liquid pentane and transferred to a freeze-drying chamber. Water and solvents sublime during freeze-drying, and the gel structure solidifies into a low-density microcellular foam.

In the phase-inversion process the initially homogeneous solution separates into two interspersed liquid phases prior to the actual transition from solution to gel. These interspersed phases can be considered as consisting of droplets of one liquid phase embedded in a matrix of the other. These droplets represent the incipient voids in the finished gel and they must be stabilized in the solution-to-gel transition. Three principle steps occur in the phase-inversion process during the extrusion of the cellulose acetate solutions into cold water: (1) loss of solvents, (2) gelation, and (3) loss of residual solvent and swelling agent.

From the above brief description of the general process for making polymer gels, it is clear that the cellulose acetate polymer system has definite requirements that must be met to achieve a polymer gel with the desired properties. Since the variables affecting this process are many and very specific, the particular formulation used so that care must be taken in low density, small cell size foams are produced.

The following two solutions are examples of formulations that give good foams. However, formulations using other solvents and swelling agents can possibly be used though not as effectively:

|  | No. 1 | No. 2 |
| --- | --- | --- |
| Cellulose acetate E-4655 | 6 grams | 3 grams |
| $Mg(ClO_4)_2$ anhydrous | 10 grams | 10 grams |
| Water | 30 grams | 25 grams |
| Ethyl d-1 lactate | 15 grams | 42 grams |
| Acetone | 39 grams | 20 grams |

Solution No. 1 produced foam of 0.08 to 0.1 g/cc density and No. 2 produced foam in a density 0.065 g/cc.

The cellulose acetate E-4655 is made by Eastman. Cellulose acetate is a high viscosity polymer of about 17 Pa·s, which has been substituted to 39.4% acetyl and contains 3.8% hydroxyl. This is one of several cellulose esters that could be used, the other esters vary in viscosity from 1 to 25 Pa·s (10–25 poises) and also in acetyl and hydroxyl content. This specific polymer is used herein to maintain a high viscosity in dilute solutions. The polymer concentration is a primary variable in controlling the density of the final foam. Foams produced from the above formulation with 6% cellulose acetate generally have densities from 0.08 to $0.15 \times 10^3$ kg/m$^3$ depending on other varibles. Formulations used with as little as 3% cellulose acetate achieved foam densities of $0.065 \times 10^3$ kg/m$^3$. The highest density foam produced by this formulation thus far is $0.6 \times 10^3$ kg/m$^3$ using 22% cellulose acetate; however, higher densities are possible, but not preferable for laser target encapsulation.

The next two components in the solution formulation, magnesium perchlorate [$Mg(ClO_4)_2$] and water, make up the swelling agent and non-solvent, respectively. The exact mechanisms of these components' interactions with the polymer and each other is not clearly understood. However, they are needed to make porous polymer gels. If they are not used, only full-density films can be fabricated. As the magnesium perchlorate concentration in the swelling agent increases, the amount of water incorporated into the polymer gel increases (to a limit) and thus reduces the ultimate foam density. This is due to the $Mg^{++}$ ions, which hydrate the water present. Studies have shown that magnesium ions from magnesium perchlorate can have up to 80 waters of hydration aggregated about each $Mg^{++}$ ion. This action is demonstrated by the fact that water is a non-solvent for cellulose acetate, while a concentrated solution of magnesium perchlorate in water will dissolve cellulose acetate. The magnesium ions also probably form complexes with the OH and CO groups on the cellulose acetate. However, it has been shown that the $Mg^{++}$ ions are not strongly bound to the cellulose acetate gel since soaking the polymer gel in water for 24 hours will reduce the $Mg^{++}$ ion concentration to 50 ppm.

The acetone and ethyl lactate in the above formulation are solvents for cellulose acetate. They were chosen to meet requirements of the phase-inversion and extrusion processes. For phase inversion to take place and yield microcellular gels, the solvents must be miscible with each other and soluble in water. Also, the solvents must diffuse out of the polymer gel readily into water, and any residual solvents must come out on freeze-drying without changing the size or shape of the frozen gel. This is important because in the planned procedure of the encapsulation process, for example, the amount of time the gel can soak in water to allow the solvents to diffuse out is 24 hours or less. This means that some residual solvent may remain in the gel and must be removed at low temperatures during the freeze-drying process. Therefore, the solvents must have high vapor pressures at low temperatures.

Ethyl lactate was chosen as a solvent due to the extrusion applications desired therefor. During extrusion, the cellulose acetate solution is forced a small cross-section orifice, such as a 100–450 μm diameter needle, the outer end of which is located below the surface of the water bath and is pointed down. The polymer solution will fall away from the orifice as a smooth cylinder, square, or other orifice configuration if its density is about $1.0 \times 10^3$ kg/m$^3$. The addition of ethyl lactate increases the solution density. Although a cellulose acetate solution with an all-acetone solvent would be better for the freeze-drying process because of the higher vapor pressure of acetone, this solution will not extrude smoothly in the apparatus.

Another very important variable in achieving foams with the desired properties is the temperature of the water bath into which the solution is extruded. To get foams with cell sizes in the micrometer range requires that the polymer solution be gelled in water of 0–10° C. Gels produced at 0° C are opalescent while gels produced from the same solution at 25° C are opaque. The opalescent gels have submicroscopic pore structure and are called ultragels. The opaque gels have pore structures that are discernible under a microscope and are called microgels. Foams produced from ultragels are preferable because they are translucent to light. Foams produced from microgels are opaque to transmitted light which, for example, in encapsulation applications makes locating microspheres therein more difficult. However, some microgels have pores in the 1 to 2 μm range and would make acceptable foams.

To produce the low-density, microcellular foam having cell sizes ranging from 0.3 μm to 2 μm, the following operational sequence is carried out for an exemplary solution.

1. Dissolve 6.0 grams of Eastman E-4655 cellulose acetate in solution composed of 10.0 grams magnesium perchlorate, anhydrous, 30.0 grams water, 15.0 grams ethyl D-L lactate, and 39.0 grams acetone at a temperature of 25° to 50° C.

2. Dip, if used in a configured mold or container, or extrude, through a configured orifice, the thus formed polymer solution into a water bath maintained at 0°–10° C, causing gelling of the solution. Polymer solution temperature may be from 25° C or cooled to −10° or −20° C. Water temperature ranging from 0° to 10° C.

3. Soak the resulting cellulose acetate gel in the water bath of a temperature of 0°–30° C for time periods of 16 to 24 hours to provide sufficient time for the solvents and swelling agents to diffuse out of the gel.

4. Freeze the thus soaked polymer gel in −70° to −80° C liquid pentane. This step requiring a time period of a few minutes to less than 5 min.

5. Freeze-dry (4 to 8 hours) depending on thickness, wherein water and solvents sublime and the gel structure solidifies into low density microcellular foam.

6. Cutting the foam to required shape, where necessary, or removing the formed foam from the mold or container. The cutting may be accomplished by a vibrationally driven razor or other appropriate means.

Table I sets forth the results of a chemical analysis of cellulose acetate foam produced by the above-described phase-inversion, freeze-dry process, showing the principle components.

TABLE I

| Element | Content (%) |
| --- | --- |
| C | 47.44 |
| H | 5.67 |
| N | none |
| O | 46.89[a] |

[a]By difference

Table II gives the trace elements present in the produced cellulose acetate foam as found by chemical analysis.

TABLE II

| Element | ppm |
| --- | --- |
| Fe | 400 |
| Si | 400 |
| Cu | 200 |
| Na | <200 |
| Al | 100 |
| Mg | 100 |
| Ca | 80 |
| Cr | 80 |
| Pb | 80 |
| Zn | 80 |
| B | 40 |
| Ga | < 40 |
| Mn | 20 |
| Ni | 20 |
| Ag | 10 |
| Sr | 6 |

TABLE II-continued

| Element | ppm |
| --- | --- |
| Be | < 2 |

Table III sets forth the heat capacity of the thus produced cellulose acetate polymer determined by a Perkin Elmer DSC-1 scanning calorimeter.

TABLE III

| Temperature (° C) | Heat capacity (J/kg-° K) |
| --- | --- |
| 30 | 1.05 |
| 50 | 1.17 |
| 90 | 1.25 |
| 110 | 1.38 |
| 190 | 1.51 |
| 210 | 1.76 |

While the above-described low density, small cell size foam has various applications, it has particular application in the encapsulation of a quality of fusion fuel for laser targets, wherein a cell size not greater than 2 $\mu$m, a density of about $0.1 \times 10^3$ kg/m$^3$, and a chemical composition of low average atomic number are required. Further, the fuel can be suspended in the polymer solution and encapsulated therein by the process of making the foam, either by positioning a fuel capsule in a mold and filling the mold with the solution, or by injecting the fuel capsule into an extrusion orifice configured to position the capsule while the solution flows therearound during the extruding process, such that the fuel capsule is properly located with respect to the foam thickness in the end product.

It has thus been shown that the present invention provides a low density foam having a cell size no greater than 2 $\mu$m, and as small as about 0.3 $\mu$m, and method for making the foam based upon a phase-inversion technique of a specified formulation followed by a freeze-drying operation.

While particular parameters have been described for illustrating the invention, modifications will become apparent to those skilled in the art, and it is intended to cover in the appended claims all such modifications as come within the spirit and scope of the invention.

What I claim is:

1. A cellulose acetate foam having a density in the range of 0.065 to $0.6 \times 10^3$ kg/m$^3$ and a cell size in the range of 0.3 to 2 $\mu$m.

2. The foam defined in claim 1, wherein the density is about $0.1 \times 10^3$ kg/m$^3$ and the cell size is about 2 $\mu$m.

* * * * *